A. BERGQUIST.
STANCHION.
APPLICATION FILED JUNE 5, 1912.
1,066,983.
Patented July 8, 1913.
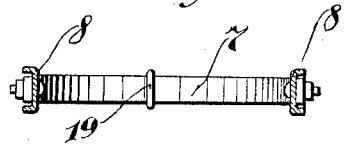
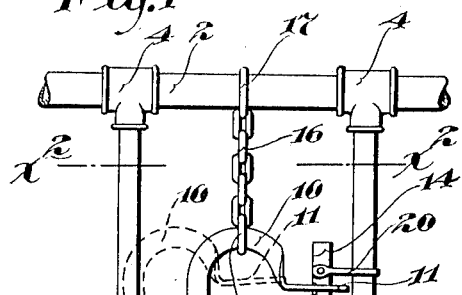
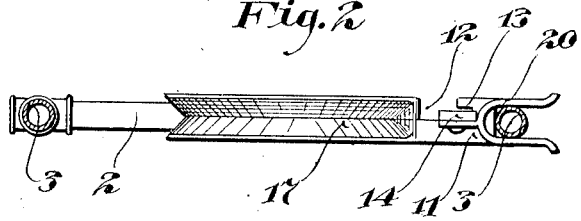
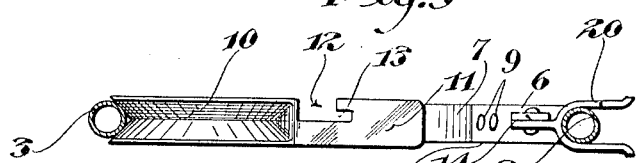
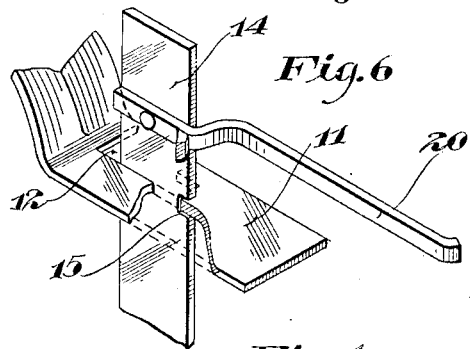
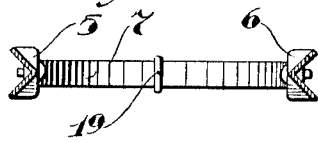
Witnesses:
E. C. Skinkle
Geo. Knutson
Inventor:
Axel Bergquist,
By his Attorneys;
Williamson Merchant

UNITED STATES PATENT OFFICE.

AXEL BERGQUIST, OF DASSEL, MINNESOTA.

STANCHION.

1,066,983.

Specification of Letters Patent.

Patented July 8, 1913.

Application filed June 5, 1912. Serial No. 701,936.

*To all whom it may concern:*

Be it known that I, AXEL BERGQUIST, a citizen of the United States, residing at Dassel, in the county of Meeker and State of Minnesota, have invented certain new and useful Improvements in Stanchions; and I do hereby declare the following to be a full, clear, and exact description of the invention, such as will enable others skilled in the art to which it appertains to make and use the same.

My invention has for its object to provide an extremely simple and efficient stanchion for the well known purpose of securing stock in their stalls, and, to this end, it consists of the novel devices and combinations of devices, hereinafter described and defined in the claims.

The invention is illustrated in the accompanying drawings, wherein like characters indicate like parts throughout the several views.

Referring to the drawings, Figure 1 is a view of the improved stanchion in elevation attached in working position to a portion of a manger frame, some parts of the improved stanchion being shown in different positions by means of dotted lines; Fig. 2 is a view partly in plan and partly in horizontal section, taken on the line $x^2 \; x^2$ of Fig. 1, on an enlarged scale, some parts being removed; Fig. 3 is a view corresponding to Fig. 2 with the exception that some of the parts are shown in different positions; Fig. 4 is a horizontal section taken on the line $x^4 \; x^4$ of Fig. 1; Fig. 5 is a horizontal section, taken on the line $x^5 \; x^5$ of Fig. 1; and Fig. 6 is a detail view in perspective, showing means for holding the so-called yoke bars interlocked at their free ends.

The numeral 1 indicates the floor line of a stable, not shown. Secured to the stall or stable structure, by any suitable means, not shown, is a manger frame comprising vertically spaced horizontally extended rods 2 connected by a pair of laterally spaced vertically extended rods 3. These rods 2 and 3 are, as shown, preferably in the form of pipes connected by T-couplings 4. As shown in Fig. 1, the lower horizontal pipe 2 is spaced above the floor line 1.

The improved stanchion comprises a pair of horizontally spaced upright yoke bars 5 and 6 connected at their lower ends by a flat spring bow 7 and having their upper ends detachably secured together. These yoke bars 5 and 6 are, as shown, each constructed from a single angle bar arranged with their vertices projecting inward and toward each other, as best shown in Fig. 4. Where the ends of the spring bow 7 are connected to the yoke bars 5 and 6, said yoke bars are upset to form short channel sections 8 adapted to receive, flatwise, the ends of the spring bow 7. Short nutted bolts 9 detachably connect the spring bow 7 to the channel sections 8. The yoke bar 5, at its extreme upper end, terminates in an inwardly upwardly and downwardly curved extension 10, having its free end flattened to form a horizontally extended lock lug 11. Formed in one edge of the lock lug 11 is a lock notch 12 having a lateral extension 13. At its extreme upper end, the yoke bar 6 has its flanges pressed together to form a rectangular bar extension 14, having in its outer edge portion a lock notch 15. The lock notch 12 is of such width as to receive the intermediate portion of the bar extension 14 by a lateral movement thereof and the spring bow 7 tends to yieldingly hold the lock notch 15 interlocked with the lock extension 13.

The improved stanchion is suspended intermediately between the pipes 2 and 3 of the manger frame and normally in the same vertical plane therewith by means of a short chain 16, terminating at each end in a ring 17. The upper ring 17 is telescoped onto the upper pipe 2 of the manger frame and the lower ring 17 is telescoped onto the extension 10 of the yoke bar 5. At its lower end, the improved stanchion is anchored to the lower pipe 2 of the manger frame by means of a short chain 18, terminating at each end in a ring 19. The upper ring 19 is telescoped onto the spring bow 7 and the lower ring 19 is telescoped onto the lower pipe 2 of the manger frame. In actual practice, suitable means may be provided for securing the rings 17 and 19 against lateral movements on the pipes 2 of the manger frame.

Secured to the bar extension 14, just above the lock notch 15, is an outwardly and horizontally projecting fork guide 20 arranged to embrace the adjacent pipe 3 of the manger frame. When the lock lug 11 is released from the bar extension 14, the spring bow 7 yieldingly holds the upper end portion of the yoke bar 5 pressed against the adjacent pipe 3 of the manger frame with its diverging flanges embracing the same, as shown by full lines in Fig. 3 and by dotted lines in Fig. 1.

As is evident, the fork guide 20 and the flanges of the yoke bar 5 hold the improved stanchion in its proper place when in an open or inoperative position. To release an animal from the improved stanchion, it is only necessary to force the yoke bar 5, at its upper end, toward the yoke bar 6, against the tension of the spring bow 7, and then by a lateral movement thereof the lock lug 11 is released from the bar extension 14. The chain connections 16 and 18 permit sufficient floating or universal movements of the improved stanchion to give the attached animal all the necessary freedom required for its comfort.

What I claim is:

1. The combination with a manger frame including a pair of horizontally spaced upright rods, of a pair of upright yoke bars mounted between the rods of said manger frame, a spring bow connecting the lower ends of said yoke bars and tending to separate and yieldingly hold their upper ends pressed into engagement with the rods of said manger frame, a latch yieldingly holding the free ends of said yoke bars interlocked against the tension of said spring bow, means holding one of said yoke bars interlocked with one of the rods of said manger frame, when said yoke bars are in either their open or closed positions, and means for holding the other of said yoke bars, when in an open position, interlocked with the other rod of said manger frame, against lateral movement, substantially as described.

2. The combination with a manger frame, including a pair of horizontally spaced upright rods, of a pair of upright yoke bars mounted between the rods of said manger frame, a spring bow connecting the lower ends of said yoke bars and tending to separate and yieldingly hold their upper ends pressed into engagement with the rods of said manger frame, means holding the upper ends of said yoke bars interlocked against the tension of said spring bow, a forked guide on one of said yoke bars with its prongs arranged to embrace one of the rods of said manger frame, when said yoke bars are in either their open or closed positions, and the other of said yoke bars having outwardly diverging flanges arranged to embrace the other rod of said manger frame, when said yoke bars are open, said fork guide and diverging flanges holding said yoke bars against lateral movements, when in their open positions, substantially as described.

In testimony whereof I affix my signature in presence of two witnesses.

AXEL BERGQUIST.

Witnesses:
S. N. GAYNER,
H. J. JOHNSON.

Copies of this patent may be obtained for five cents each, by addressing the "Commissioner of Patents. Washington, D. C."